United States Patent
Fujii et al.

(10) Patent No.: US 9,080,612 B2
(45) Date of Patent: Jul. 14, 2015

(54) DRIVING FORCE TRANSMISSION DEVICE

(75) Inventors: Tomoharu Fujii, Isehara (JP); Tsuyoshi Yamanaka, Hiroshima (JP); Shigeru Ishii, Atsugi (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 161 days.

(21) Appl. No.: 13/819,402

(22) PCT Filed: Jul. 25, 2011

(86) PCT No.: PCT/JP2011/066837
§ 371 (c)(1),
(2), (4) Date: Jul. 8, 2013

(87) PCT Pub. No.: WO2012/029441
PCT Pub. Date: Mar. 8, 2012

(65) Prior Publication Data
US 2013/0313063 A1 Nov. 28, 2013

(30) Foreign Application Priority Data
Aug. 31, 2010 (JP) ................................ 2010-193767

(51) Int. Cl.
*F16D 25/08* (2006.01)
*F16D 13/40* (2006.01)
*F16D 13/72* (2006.01)
(Continued)

(52) U.S. Cl.
CPC ................ *F16D 13/40* (2013.01); *F16D 13/72* (2013.01); *F16D 25/044* (2013.01); *F16D 25/082* (2013.01); *F16D 2048/0212* (2013.01); *F16D 2300/0212* (2013.01)

(58) Field of Classification Search
CPC ..... F16D 25/044; F16D 25/082; F16D 13/72; F16D 2048/0212; F16D 300/0212
USPC ........ 192/113.22, 113.23, 70.12, 70.14, 66.3, 192/66.31, 66.32
See application file for complete search history.

(56) References Cited

U.S. PATENT DOCUMENTS

| 7,425,181 B2 * | 9/2008 | Nakagaito et al. ............... 464/46 |
| 2004/0050645 A1 * | 3/2004 | Martin ....................... 192/105 C |
| 2010/0072020 A1 * | 3/2010 | Cimatti .................... 192/113.35 |

(Continued)

FOREIGN PATENT DOCUMENTS

| JP | 04-019425 | 1/1992 |
| JP | 2002-106597 A | 4/2002 |

(Continued)

*Primary Examiner* — Rodney H Bonck
*Assistant Examiner* — Stacey Fluhart
(74) *Attorney, Agent, or Firm* — Young Basile

(57) ABSTRACT

Provided are devices and methods to minimize drag caused by abrasion powder between clutch plates and to prevent a faulty engagement or release of a dry clutch. A hybrid driving force transmission device is provided, wherein a multi-plate dry clutch is arranged in a sealed space and used for connecting/disconnecting transmission of a driving force is provided with drive plates, driven plates, friction facings, and a housing cover. The drive plates are splined to a clutch hub, and have, in the sections thereof that are splined to the clutch hub, vent holes for channeling the air flowing in the axial direction. The driven plates are splined to a clutch drum. The housing cover has an external air intake hole for drawing external air into the sealed space, and an external air discharge hole for discharging the airflow from the sealed space to the outside.

5 Claims, 7 Drawing Sheets

(51) Int. Cl.
*F16D 25/04* (2006.01)
*F16D 48/02* (2006.01)

(56) References Cited

U.S. PATENT DOCUMENTS

2010/0288597 A1* 11/2010 Kuwahara et al. ......... 192/85.61
2013/0015025 A1* 1/2013 Tokumasu et al. ...... 188/218 XL
2014/0284164 A1* 9/2014 Akimoto et al. ............. 192/66.3

FOREIGN PATENT DOCUMENTS

JP 2008-215525 9/2008
JP 2010-151313 A 7/2010

* cited by examiner

FIG. 5
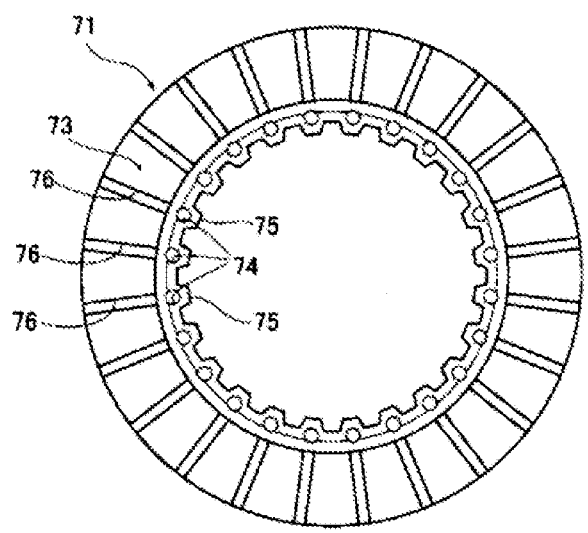
FIG. 6A          FIG. 6B
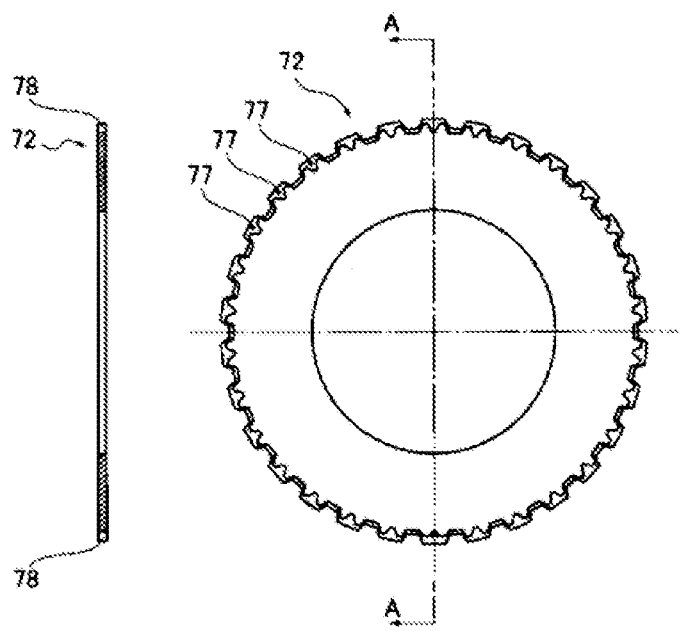

DRIVING FORCE TRANSMISSION DEVICE

TECHNICAL FIELD

The present invention relates to a driving force transmission device applied to a vehicle drive system and including a dry clutch which is disposed in a sealed space for selectively connecting and disconnecting a driving force transmission

BACKGROUND

A conventional hybrid driving force transmission device in which an engine, a motor and clutch unit and a transmission unit are connected in series is known. The motor and clutch unit includes a multiple-plate dry clutch disposed inside an electrical motor. More specifically, the motor and clutch unit includes a clutch hub connected to an output shaft of the engine, a clutch drum to which a rotor of the electrical motor is fixed and which is connected to an input shaft of the transmission unit, and the multiple-plate dry clutch disposed between the clutch hub and the clutch drum (for example, Japanese Laid-Open Patent Application No. 2010-151313).

However, in the conventional hybrid driving force transmission device, the multiple-plate dry clutch is housed in the dry space covered by a unit housing, and sealed by the sealing member. Therefore, when friction facings are subjected to repeated connections/disconnections, the abrasion powder accumulate between friction surfaces without being discharged to the outside, which would cause drag between drive plates and driven plates with the result that the multiple-plate dry clutch will suffer from poor engagement/release.

BRIEF SUMMARY

The present invention has been made by focusing on the above-mentioned problems, and the object of providing such a driving force transmission device which is prevented from poor release/engagement states by reducing the drag caused by wear or powder caused to generate between clutch plates with a friction facing interposed for pressurized contact.

To accomplish the above object, according to the present invention, in a driving force transmission device according to the present invention, the dry clutch is configured to include a first clutch plate, second clutch plate, friction facing, and a cover member.

The first clutch plate is splined to the clutch hub and has a vent hole allowing the airflow there through in the axial direction. The second clutch plate is splined to a clutch drum. The frictional facing is provided on one of the first clutch plate and the second clutch plate and configured to press a friction surface against the other clutch plate when engaging the clutch. The cover member includes an outside air inlet or intake hole to take air in the sealed space and an outside air outlet or discharge hole to exhaust the airflow out of the sealed space.

As described above, the dry clutch is configured to include an outside air intake hole, an outside air discharge hole, and air vent provided in the first clutch for passing through an air stream in the axial direction. Therefore, the pressure difference affected by centrifugal force at rotation about the axis of rotation of clutch, air is sent to the clutch drum from the clutch hub, increasing a pressure at the side of clutch drum, while reducing a pressure at the side of the clutch hub, airflow occurs in which air moves in the radial direction. Due to the occurrence of this airflow in the radial direction, the pressure on the side of clutch hub decreases with the generation of airflow on the inner diameter side along the axial direction through the external air intake hole and vent hole. In addition, since the spline coupling or connection portion with the margin gap of second clutch plates provides a low ventilation resistance, the air stream flown into the clutch drum by deflecting its direction from the axial direction inside to a radial direction is converted to generate such an air stream from the spline coupling portion through external air exit hole for exhausting to the outside. Due to generation of the airflow function, the airflow along the streamline of the "outside→axially on inner diameter side→radially→axially on outer diameter side→outside", is generated, thus wear debris or powders from friction facings move along with this airstream for exiting to the outside.

As a result, it is possible to reduce the drag caused by wear debris or powder between the clutch plates pressed each other through the friction facings to prevent failure in release/engagement operation of dry clutch.

BRIEF DESCRIPTION OF THE DRAWINGS

The description herein makes reference to the accompanying drawings wherein like reference numerals refer to like parts throughout the several views, and wherein:

FIG. 5 is a front view showing a drive plate for a multiple-plate dry clutch in the hybrid driving force transmission device in the first embodiment.

FIG. 6 is a view of a driven plate for the hybrid driving force transmission device in the first embodiment with a cross section along Line A-A and a front view (a) and a front view (b).

DETAILED DESCRIPTION

In the following, a description is made of the best embodiments of driving force transmission device for realizing the driving force transmission device according to the present invention based on the first and second embodiments shown in the accompanying drawings.

Figure 1:
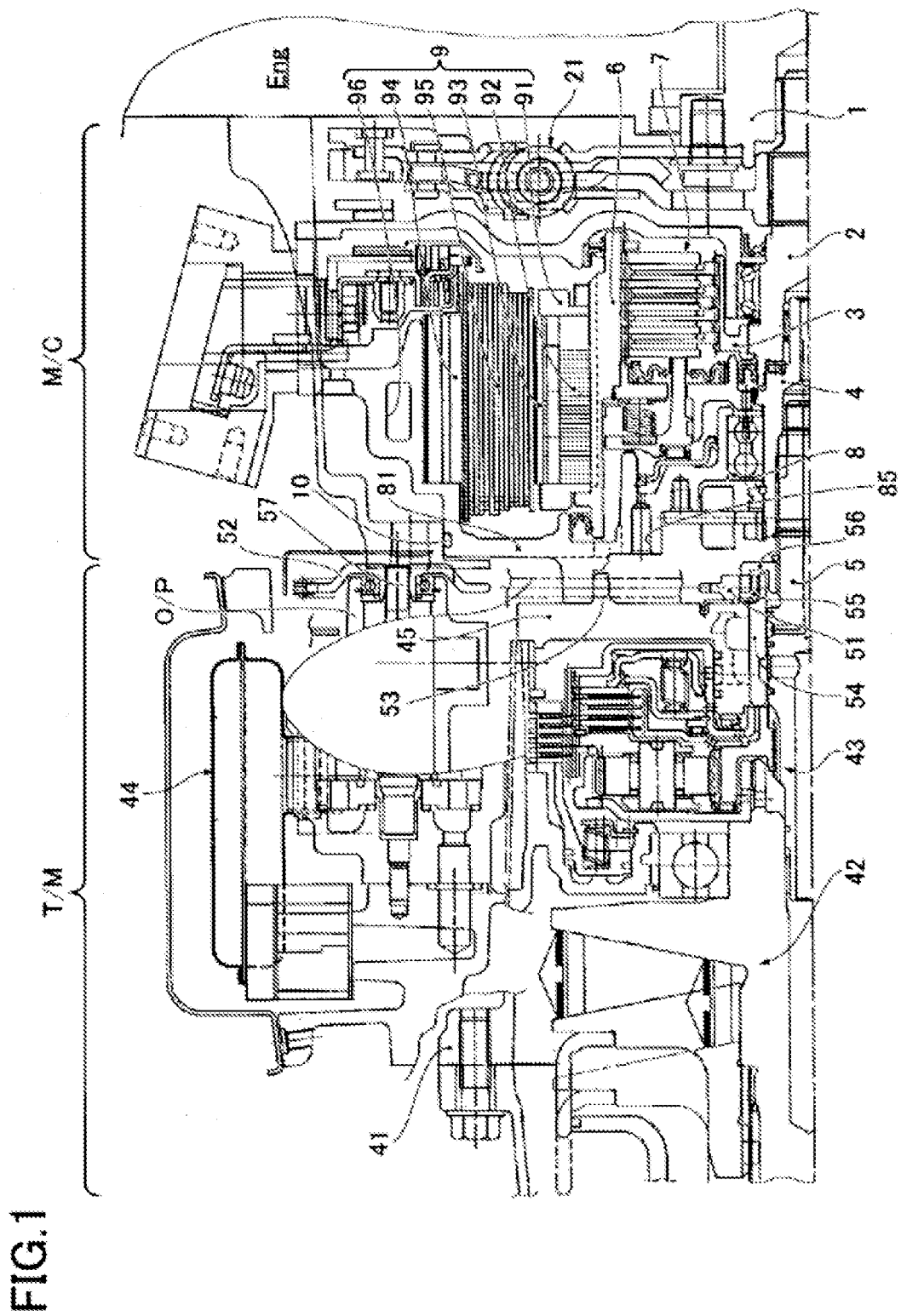
FIG. 1 is a schematic diagram showing an overall outline of a hybrid driving force transmission device in a first embodiment.

First, description is made of the configuration. As shown in FIG. 1, the hybrid driving force transmission device includes an engine Eng, a motor and clutch unit M/C, a transmission unit T/M, an engine output shaft 1, a clutch hub shaft 2, a clutch hub 3, a clutch drum shaft 4, a transmission input shaft 5, a clutch drum 6, a dry clutch 7, a slave cylinder 8, and a motor/generator 9, as shown in FIG. 1.

Here, the slave cylinder 8 for controlling engaging/release of the multiple-plate clutch 7 is generally called a CSC (Centric Slave Cylinder).

The hybrid driving force transmission device in the first embodiment has an electric vehicle running mode in which the motor/generator 9 and the transmission input shaft 5 are connected or engaged through the clutch drum 6 and the clutch drum shaft 4 when the multiple-plate dry clutch 7 which is normally in a released state, and a hybrid vehicle running mode in which the engine Eng and the motor/generator 9 are connected through the multiple-plate dry clutch 7 by connecting the engine output shaft 1 and the clutch hub shaft 2 through a damper 21, and the clutch hub 3 and the clutch drum 6 are connected through the engaged (fastened) multiple-plate dry clutch 7.

The motor and clutch unit M/C includes the multiple-plate dry clutch 7, the slave cylinder 8, and the motor/generator 9. The multiple-plate dry clutch 7 is connected to the engine Eng and configured to connect and disconnect the transmission of a driving force from the engine Eng. The slave cylinder 8 controls the engaging and the disengaging of the multiple-plate dry clutch 7 by an oil pressure. The motor/generator 9 is disposed at an outer peripheral position of the clutch drum 6 disposed outside the multiple-plate dry clutch 7 to transmit the driving force of the motor/generator 9 to the transmission output shaft 5 through the clutch drum 6. A cylinder housing 81 including a first clutch pressure oil passage 85 connecting to the slave cylinder 8 is provided on the motor and clutch unit M/C through an O-ring 10 to seal between the motor and clutch unit M/C and the cylinder housing.

The motor/generator 9 is a synchronous type-alternate current electric motor and includes a rotor supporting frame 91 provided integrally with the clutch drum 6, a rotor 92 which is fixedly supported by the rotor supporting frame 91 and in which a permanent magnet is embedded, a stator 94 disposed outside the rotor 92 with an air gap 93 and fixed to the cylinder housing 81, and a stator coil 95 wound on the stator 94. Meanwhile, a water jacket 96 to pass cooled water is provided in the cylinder housing 81.

The transmission unit T/M is connected to the motor and clutch unit M/C and includes a transmission housing 41, a V belt type-continuously variable mechanism 42, and an oil pump O/P. The V belt type-continuously variable mechanism 42 is housed in the transmission housing 41, and configured to acquire a non-step variable ratio by winding a V belt between two pulleys and changing a contacting diameter of the pulleys coming in contact with the belt. The oil pump O/P is an oil source which supplies an oil pressure to a required part, makes an oil pump pressure as an original pressure, and guides an oil pressure from a control valve (not shown) which adjusts a variable oil pressure to a pulley chamber, a clutch and braking oil pressure or the like, to the required part. The transmission unit T/M is further provided with a mechanism 43 for exchanging forward and backward running of a car, an oil tank 44, and an end plate 45. The end plate 45 includes a second clutch oil pressure passage 47 (FIG. 2).

The oil pump O/P is configured to perform pump driving by transmitting a rotational driving torque of the transmission input shaft 5 through a chain driving mechanism. The chain driving mechanism includes a drive side sprocket 51 rotating in accordance with the rotational driving of the transmission input shaft 5, a driven sprocket 52 rotating a pump shaft 57, and a chain wound on the driving side sprocket 51 and the driven sprocket 52. The drive side sprocket 51 is disposed between the transmission input shaft 5 and the end plate 45 and rotatably supported on a stator shaft 54 fixed to the transmission housing 41, through a bush 55. The rotational driving torque from the transmission input shaft 5 is transmitted to the drive side sprocket 51 through a first adapter 56 which is configured to be splined to the transmission input shaft 5 and to be connected to the drive side sprocket 51 by a hook.

Figure 2:
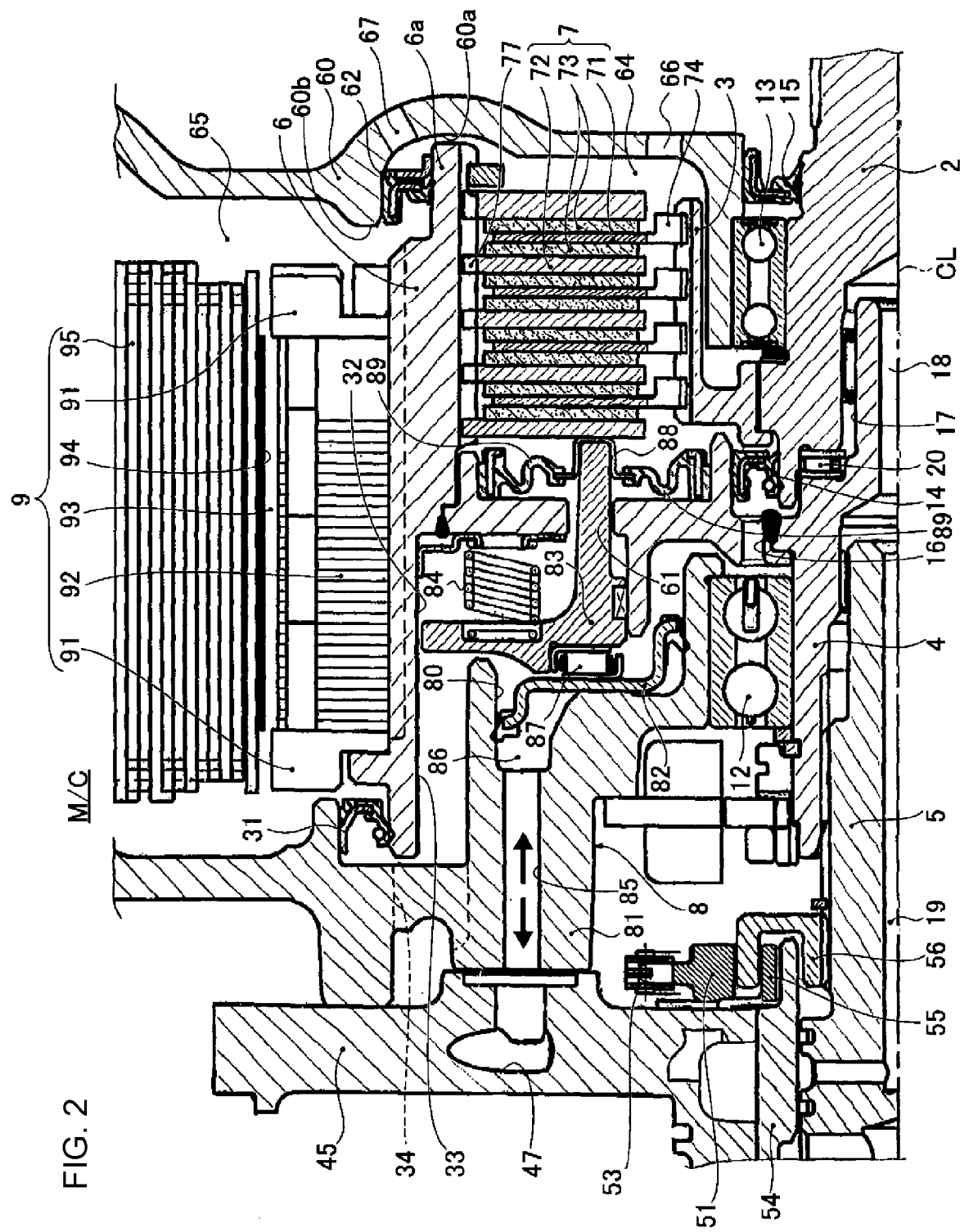
FIG. 2 is a cross-sectional view showing the configuration of the multiple-plate dry clutch of the motor and clutch unit in the hybrid driving force transmission device in the first embodiment

FIG. 2 is a sectional view showing a main configuration of the motor and clutch unit M/C in the hybrid driving force transmission device according to the embodiment, and FIGS. 3 to 6 are views showing respective components of the multiple-plate dry clutch 7. A configuration of the multiple-plate dry clutch 7 of the motor and clutch M/C is now described with reference to FIGS. 2 and 3.

The clutch hub 3 is connected to the engine output shaft 1 of the engine Eng. The multiple-plate dry clutch 7 includes a plurality of drive plates 71 (first clutch plates) which are splined to the clutch hub 3, as shown in FIG. 2.

The clutch drum 6 is connected to the transmission input shaft 5 of the transmission unit T/M. The multiple-plate dry clutch 7 includes a plurality of driven plates 72 (second clutch plates) which are splined to the clutch drum 6, as shown in FIG. 2.

The plurality of driven plates 72 are disposed with intervals between each other and the plurality of drive plates 71 each have frictional facings 73, 73 attached to both surfaces of the driven plates 72. The driven plates 72 and the drive plates 71 are disposed between the clutch hub 3 and the clutch drum 6. The multiple-plate dry clutch 7 is formed by arranging the drive plates 71 each having the frictional facings 73, 73 between the adjacent driven plates 72. That is to say, a torque is transmitted (connected) between the clutch hub 3 and the clutch drum 6 by engaging (fastening) the multiple-plate dry clutch 7, and a torque is not transmitted (disconnected) between the clutch hub 3 and the clutch drum 6 by disengaging (releasing) the multiple-plate dry clutch 7.

The slave cylinder 8 is an oil pressure actuator to control the fastening and the releasing of the multiple-plate dry clutch 7 and is disposed between the transmission unit T/M and the clutch drum 6. The slave cylinder 8 includes a piston 82 provided slidably in a cylinder chamber 80 of the cylinder housing 81, the first clutch pressure oil passage 85 provided in the cylinder housing 81 and configured to guide a clutch pressure made by the transmission unit T/M, and a cylinder oil chamber 86 communicating with the first clutch pressure oil passage 85, as shown in FIG. 2. A needle bearing 87, a piston arm 83, a return spring assembly 84 and an arm press-fitting plate 88 are disposed between the piston 82 and the multiple-plate dry clutch 7, as shown in FIG. 2.

The piston arm 83 is provided slidably in a through-hole 61 provided in the clutch drum 6 and configured to generate a pressure force among the clutch plates of the multiple-plate dry clutch 7 by a pressure force from the slave cylinder 8. The return spring assembly 84 is disposed between the piston arm 83 and the clutch drum 6. The needle bearing 87 is disposed between the piston 82 and the piston arm 83 and configured to prevent the piston 82 from being rotated in accordance with the rotation of the piston arm 83. The arm-press fitting plate 88 includes elastic bellows supporting member 89, 89 which are provided integrally with the arm press-fitting plate on an inner peripheral portion and an outer peripheral portion of the arm press-fitting plate. An inner peripheral end of the elastic bellows supporting member 89 provided on the inner peripheral portion of the arm press-fitting plate 88 and an outer peripheral end of the elastic bellows supporting member 89 provided on the outer peripheral portion of the arm press-fitting plate 88 are press-fitted with the clutch drum 6. By means of the arm press-fitting plate 88 and the elastic bellows supporting member 89, leaked oil from the piston arm 83 is blocked from flowing into the multiple-plate dry clutch 7. In other words, the arm press-fitting plate 88 and the elastic bellows supporting member 89 which are fixed hermetically to an attaching position at which the piston arm 83 is attached to the clutch drum 6 function to separate a wet space filled with oil in which the slave cylinder 8 is disposed and a dry space in which the multiple-plate dry clutch 7 is disposed.

Figure 3:
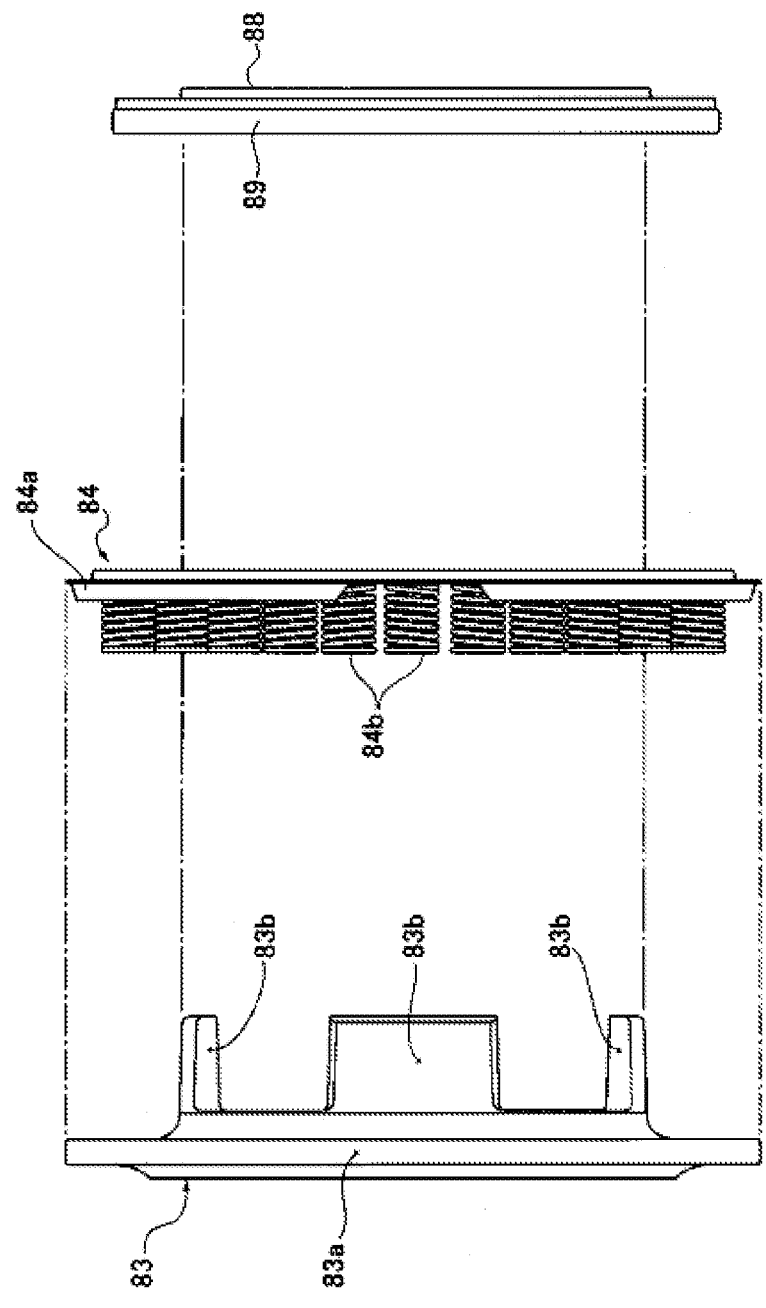
FIG. 3 is an exploded side view showing a piston assembly of the multiple-plate dry clutch in a hybrid driving force transmission device in the first embodiment.
Figure 4:
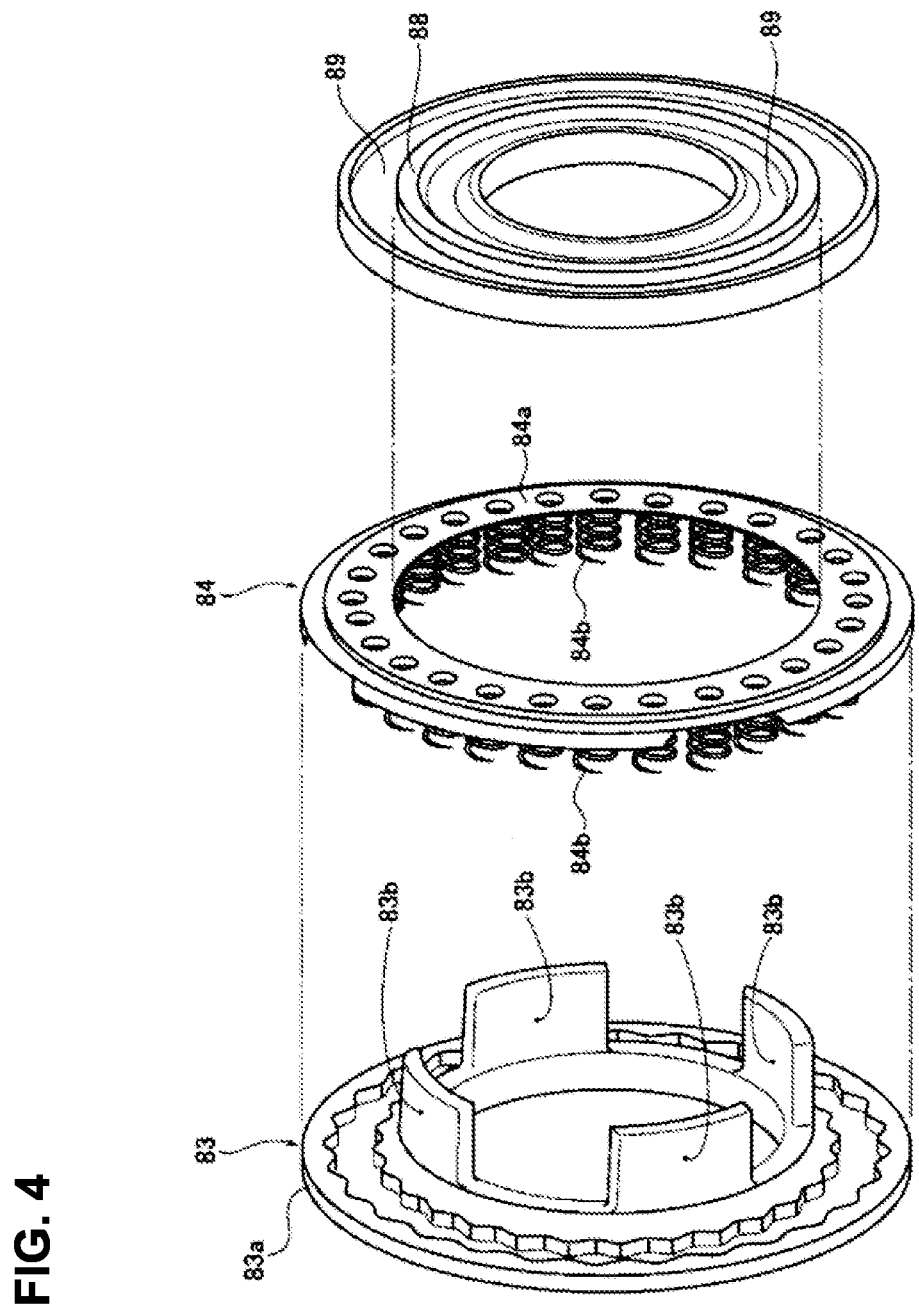
FIG. 4 is an exploded perspective view showing a piston assembly of the multiple-plate dry clutch in a hybrid driving force transmission device in the first embodiment.

The piston arm 83 is composed of a ring-shaped arm body 83a and four arm protrusions 83b protruding from the arm body 83a at four positions on a periphery of the arm body 83a, as shown in FIGS. 3 and 4.

The return spring assembly 84 is composed of a ring-shaped spring supporting plate 84a and a plurality of coil springs 84b fixed to the spring supporting plate 84a, as shown in FIGS. 3 and 4.

The arm protrusions 83b of the piston arm 83 are pressed in the arm press-fitting plate 88, as shown in FIG. 2, and the arm press-fitting plate 88 includes elastic bellows supporting members 89, 89 provided integrally with the arm press-fitting pale 88 on the inner and outer side portion of the arm press-fitting plate 88, as shown in FIGS. 3 and 4.

A leaked oil recovery passage in the embodiment includes a first bearing 12, a first seal member 31, a leaked oil passage 32, a first recovery oil passage 33, and a second recovery oil passage 34, as shown in FIG. 2. More specifically, the leaked oil recovery passage mechanism returns leaked oil from a sliding portion of the piston 82 to the transmission unit T/M through the first recovery oil passage 33 sealed by the first seal member 31 and the second recovery oil passage 34 communicating 2 with the first recovery oil passage 33. In addition, the leaked oil recovery passage mechanism returns leaked oil from a sliding portion of the piston arm 83 to the transmission unit T/M through the leaked oil passage 32 sealed by a separator including the arm press-fitting plate 88 and the elastic bellows supporting members 89, the first recovery oil passage 33 sealed by the first seal member 31, and the second recovery oil passage 34.

A bearing lubrication oil passage mechanism in the embodiment 1 includes a needle bearing 20, a second seal member 14, a first shaft center oil passage 19, a second shaft center oil passage 18, a lubrication oil passage 16, and a clearance 17, as shown in FIG. 2. The bearing lubrication oil passage mechanism circulates bearing lubrication oil from the transmission unit T/M to pass the needle bearing 20, the first bearing 12 supporting rotatably the clutch drum 6 on the cylinder housing 81, and the needle bearing 87 disposed between the piston 82 and the piston arm 83, and return to the transmission unit T/M, thereby lubricating the aforementioned bearings.

The second seal member 14 is disposed between the clutch hub 3 and the clutch drum 6, as shown in FIG. 2. The second seal member 14 is configured to prevent the bearing lubrication oil from flowing from the wet space in which the slave cylinder 8 is disposed into the dry space in which the multiple-plate dry clutch 7 is disposed.

Now, detailed constructions are explained of the multiple-plate dry clutch 7 for motor & clutch unit M/C with reference to FIGS. 2, 5 and 6.

As shown in FIG. 2, the multiple-plate dry clutch 7 of the first embodiment for selectively connecting and disconnecting the driving force from engine ENG is disposed within a clutch chamber 64, which is a sealed space surrounded by a clutch hub 3, clutch drum 6 and housing cover 60 (cover member).

The housing cover 60 is formed integrally with the cylinder housing 81 to enclose the motor/generator 9 and multiple-plate dry clutch 7. Out of the inner space formed by enclosing the housing cover 60 and cylinder housing 81, a space at the side of clutch rotational axis CL (i.e., rotor axis) is configured a clutch chamber 63 for accommodating the multiple-plate clutch 7 while an outer space formed outside of the clutch chamber 64 is configured a motor chamber 65 for containing motor/generator 9.

In addition, the clutch chamber 64 and the motor chamber 65 separated by a dust seal member 62 are a dry space that were blocked from entering the oil. Note that the cylinder housing 81 is a stationary member which is supported on a first bearing 12 relative to the clutch drum shaft 4, while the housing cover 60 is supported on a second bearing 13 relative to clutch hub shaft 3 and sealed by a cover seal 15.

The multiple-plate dry clutch 7 is comprised of, as shown in FIG. 2, a drive plate 71(first clutch plate), driven plate 72 (second clutch plate), friction facing 73, and housing cover 60 (cover member).

The drive plates 71 have an annular member and are splined to the clutch hub 3 through a spline connection portion. More specifically, as shown in FIG. 5, each of the drive plates 71 has a plurality of inwardly protruding spline teeth 75 arranged on an inner periphery of the drive plate 71 and engaging with splined portions provided in the clutch hub 3. In addition, each of the frictional facings 73 attached to the opposite surfaces of each drive plate includes a plurality of peripherally arranged facing grooves 76 provided to face the spline teeth 75 and extending in a radial direction of the drive plate 71. Each of the drive plates 71 includes a plurality of airflow passages or vent holes 74 provided in a splined connection portion of each drive plate to the clutch hub 3. The airflow passages are configured to pass air in an axial direction of the multiple-plate dry clutch 7. As shown in FIG. 4, each of the airflow passages or vent holes 74 is provided at a position of each of the plurality of spline teeth 75 which are arranged inside the facing grooves 76 to face the facing grooves 76. The airflow passages or vent holes 74 of the plurality (four in the embodiment) of drive plates 71 are arranged to be communicated with each other in the axial direction of the multiple-plate dry clutch 7, as shown in FIG. 2.

The driven plates 72 are splined to the clutch drum 6, and at the spline connection portion, with the clutch drum 6 airflow passages or vent opening 77 for allowing airflow in the axial direction. More specifically, the vent opening 77 is configured by forming a recessed or concave at the central position of a spline tooth projecting outwardly so as obtain an open space when engaged with spline teeth of clutch drum 6.

A pair of the frictional facings 73 is attached to the opposite surfaces of each of the drive plates 71. Each of the driven plates 71 is brought into contact under pressure between the frictional facings of the adjacent drive plates. Thus, a frictional surface of each frictional facing 73 is in pressure-contact with a plate surface of each of the driven plates 72 when the clutch plates of the multiple-plate dry clutch 7 are fastened or engaged. Each of the frictional facings 73 is of an annular plate member as shown in FIG. 5. Each of the facing grooves 76 provided in each of the drive plates 71 is a concave groove. The facing groove has a sufficient depth so that a grooved shape is maintained even if the frictional facing 73 is worn to some extent.

As shown in FIG. 2, the housing cover 60 has an outside air intake opening or hole 66 for taking into outside air as well as outside air discharge hole 67 for discharging airflow from inside the clutch chamber 64 of sealed space to the outside. The outside air intake hole 66 is disposed to be in line with the axis of the airflow or vent hole 74 so as to introduce ambient or outside air toward the vent hole 74.

The outside air discharge hole 67 is positioned at such an outer diameter as shown in FIG. 2 such that the airflow traveling the spline connection portion of driven plates 72 will be exhausted to outside while suppressing the flow directing toward the outside air inlet or intake hole 66 by a labyrinth structure.

Here is a description of the structure of the labyrinth. First, the clutch drum 6 is formed with an axial end portion or tip portion 6a by axially extending the end portion thereof in the axial direction. On the other hand, an inner wall recess 60a is formed on housing cover 60 at a position the axial end portion 6a of clutch drum 6 protrudes into, and an inner wall projection 60b is formed on the housing cover 60 at a position radially outward of the inner wall recess 60a. In addition, an outside air discharge hole 67 is provided at a position radially outward of clutch drum 6 and radially inward of dust seal member 62 so that such a structure (labyrinth structure) to suppress the flow toward the outside air intake hole 66.

Next, an operation of the hybrid driving force transmission device according to the embodiment is described by divining into "Clutch engagement/release operation by slave cylinder" and "Wear powder discharge process of multiple-plate dry clutch". A clutch engagement/releasing operation on the multiple-plate dry clutch 7 by a slave cylinder 8 is now described with reference to FIG. 2.

When the multiple-plate dry clutch 7 is engaged or fastened by the slave cylinder 8, a clutch oil pressure produced by the transmission unit T/M is supplied to the cylinder oil chamber 86 through the first clutch pressure oil passage 85 provided in the cylinder housing 81. Thereby, an oil pressure force corresponding to a value obtained by multiplying the oil pressure by a receiving pressure area is applied to the piston 82 to move the piston 82 in a right direction as viewed in FIG. 2 against a biasing force of the return spring assembly 84 disposed between the piston arm 83 and the clutch drum 6. In addition, a fastening force for the clutch which corresponds to a difference between the oil pressure force and the biasing force is transmitted to the arm press-fitting plate 88 through the piston 82, the needle bearing 87, and the piston arm 83, thereby the drive plates 71 and the driven plates are forcibly contacted to engage the multiple-plate dry clutch 7, to thus perform the transmission of the driving force.

When releasing the multiple-plate dry clutch 7 which is in the fastened state, an operational oil supplied to the cylinder oil chamber 86 is returned to the transmission unit T/M through the first clutch pressure oil passage 85, thereby when the oil pressure force applied to the piston 82 is reduced, the biasing force of the return spring assembly 84 exceeds the oil pressure force, thereby the piston arm 83 and the arm press-fitting plate 88 which are assembled integrally are moved in a left direction as viewed in FIG. 2. Consequently, the fastening force applied to the arm press-fitting plate 88 is decreased to release the multiple-plate dry clutch 7.

Figure 7:
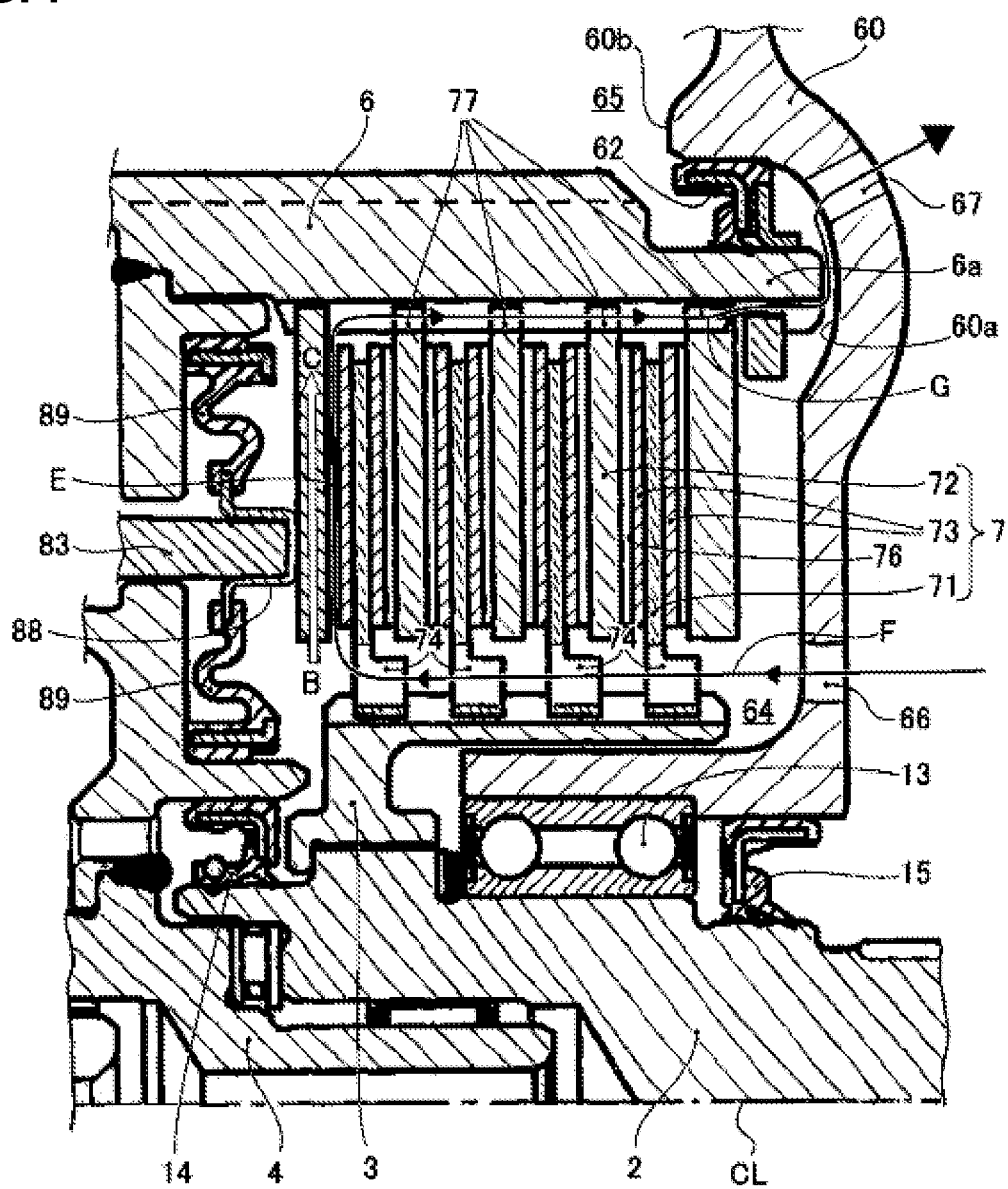
FIG. 7 is an explanatory view showing a friction powder exiting effect in the hybrid driving force transmission device.

FIG. 7 shows a diagram explaining the wear or abrasion powder discharging process in the hybrid driving force transmission device in the first embodiment. The process for exhausting the wear powder from the multiple-plate dry clutch 7 will not be explained with reference to FIG. 7.

When at least one of the clutch hub 3 and the clutch drum 6 is rotated about the clutch rotation axis CL, a centrifugal fan effect occurs by rotation of a vane comprising the clutch hub 3 and the drive plates 71 each having at the opposite surfaces the frictional facings 73 each having the plurality of facing grooves 76.

By the centrifugal fan effect, air is driven to travel from an area B of the clutch hub 3 side to an area C of the clutch drum 6 side in the radial direction of the dry, multiple-plate clutch 7, and an air pressure of the clutch drum side is increased and an air pressure of the clutch hub side is decreased, as shown in FIG. 7. A difference in pressure causes a radial airflow E travelling radially from the side of clutch hub 3 toward the side of clutch drum 6.

The provision of the radial airflow E results in an air pressure difference between outside air which is at atmospheric pressure and the pressure of the inner diametric side which is a negative pressure. Consequently, an inner diametric side-axial airflow F is generated in the multiple-plate dry clutch 7 in which the outside air taken in the clutch chamber through the outside air intake hole 66 passes the vent holes 74 and flows in the clutch hub 3 side which is at low air pressure, as shown in FIG. 7.

In addition, the spline connection portion of the driven plates 72 has a low resistance to the airflow due to sufficient gaps for moving across the plates. In addition, the spline connection portion between the driven plates 72 and the clutch drum 6 has an even lower resistance to the airflow because of the airflow clearances or vent opening 77 passing airflow in the axial direction of the clutch. Moreover, the generation of the radial airflow E results in a high pressure at the side of clutch drum 6 with a pressure difference to the atmosphere. Consequently, as shown in FIG. 7, an outer diametric side-axial airflow G is generated in the dry, multiple-plate clutch 7 in which airflow which has been introduced in the clutch drum 6 side by changing a flowing direction from the axial direction on the inner diametric side of the clutch is exhausted from the vent openings 77 through the outside air discharge hole 67 to the outside air.

The airflow generation that occurs involves a flow of air along a streamline, as shown by the arrow in FIG. 7, i.e., the flow of the streamline of airflow from the "outside→axially at inner diameter side→radially→axially at outer diameter side→the outside" (F→E→G) is generated. Here, in FIG. 7, only the E airflow is illustrated which presents airflow most proximate to the piston side, a plurality of airflow s E will be generated at portions with respective facing groove 76. Therefore, wear particles detached from the surface of friction facing 73 by the repetition of disengaging/engaging of the clutch will be discharged along this air streamline (F→E→G) to the outside.

As described above, in order to produce an air streamline (F→E→G) due to pressure difference, an outside air intake hole 66, discharge hole 67, and vent hole 74 disposed in drive plate 71 for axial airflow are provided for adoption (FIG. 7).

Therefore, a drag by wear or abrasion powder present between drive plates 71 and driven plates 72 may be suppressed and poor engagement/disengagement process of multiple-plate, dry clutch 7 will be able to be prevented.

The outside air intake hole 66, the multiple-plate dry clutch 7 of the first embodiment, the discharge hole 67 and the outside air by the pressure difference are provided in the drive plate 71, having adopted the structure (FIG. 7), and a vent hole 74 through the air stream flowing in the axial direction. Thus, the drag due to wear debris between the drive plate 71 and driven plate 72 is suppressed, the multiple-plate dry clutch 7 is released from becoming defective/engagement is prevented.

The drive plate 71 in the first embodiment is configured to provide a vent hole 74 in such positions of spline teeth protrusion portion in meshed engagement with the spline portion of clutch hub 3, that protrudes toward the inner diameter side, i.e., radially inwardly (FIG. 5). Therefore, as compared to the case in which holes are provided in the recessed portions of spline teeth, the opening area of the vent hole 74 is secured widely thus ensuring generation of an orderly axial airflow at the inner diameter side.

The friction faxing 73 in the first embodiment is provided with a facing groove 76 extending in a radial direction from the inner diameter side to the outer diameter side and the dive plate 71 is provided the vent hole 74 located inward of the facing groove 76 (see FIG. 5).

Thus, the airflow resistance the airflow exiting the vent hole 74 encounters when flowing into groove 76 will be suppressed low with a smooth change in direction of airflow from the inner diameter side axial airflow F toward the radial direction airflow E.

The driven plate 72 in the first embodiment is configured to provide a vent opening 77 that passes through the axial airflow at the spline connection portion (see FIG. 6). Therefore, the air resistance the airflow encounters when the air stream exiting the faxing groove 76 flows along the spline connection portion with clutch drum 6 will be kept low so that an orderly outer diameter side axial airflow may be secured.

The housing cover 60 in the first embodiment comprises a ambient or fresh air intake hole 66 at an inner diameter side position corresponding to the axial direction of vent hole 74 to capture the outside air toward the vent hole 74, and further comprises a discharge hole 67 for discharging the airflow travelling along the spline connection portion of driven plate 72 while suppressing the airflow directing to the outside air intake hole 66 by the labyrinth structure (see FIG. 7). Therefore, by suppressing the airflow circulating within clutch chamber 64, an orderly airflow represented by a streamline, "the outside→axially on inner diameter side→radially→axially on outer diameter side→the outside".

According to the hybrid driving force transmission device in the first embodiment, the effects listed below may be obtained.

(1) In a driving force transmission device, in which a dry clutch (multiple-plate dry clutch 7) is disposed within a concealed or sealed space (clutch chamber 64), the dry clutch (multiple-plate dry clutch 7) comprising: a first clutch plate (drive plate 71) that is splined to clutch hub 3 and has a vent hole 74 for allowing an axial airflow at the spline connection portion with the cutch hub 3; a second clutch plate (driven plate 72) that is splined to clutch drum 6; a friction facing 73 provided on one of the first clutch plate (drive plate 71) and the second clutch plate (driven plate 72) to press a friction surface against the other plate surface during engagement; a cover member (housing cover member 60) with an outside air intake hole 66 for taking the outside air into the sealed space (clutch chamber 64), an outside air discharge hole 67 for discharging the airflow from the sealed space (clutch chamber 64) to the outside.

Therefore, a drag caused by wear or abrasion powder between the clutch plates (drive plate 71 and driven plate 72) may be suppressed and the poor engagement/release states of the dry clutch (multiple-plate dry clutch 7) may be prevented.

(2) The first clutch plate (drive plate 71) has the vent hole 74 in the spline teeth that are meshed with the spline portion of clutch hub 3 at the spline teeth projection portion 75 protruding into the inner diameter side or radially inwardly (see FIG. 5).

Therefore, in addition to the effect of (1) above, as compared to the case in which an opening is provided at the spline recessed portion, a wide opening of vent hole 74 may be secured with an orderly airflow of axial, inner diameter side.

(3) The friction facings 73 is an annular plate member having a groove 76 which is formed in the radial direction toward the outer diameter position from the inner diameter position while the first clutch plate (drive plate 71) and has a vent hole 74 at the position radially inwardly of the facing groove 76 (see FIG. 5).

Therefore, in addition to the effects of (1) and (2), the airflow resistance the airflow exiting the vent hole 74 entering the facing groove 76 experiences will be held low so that a smooth change in direction of airflow from the axial inner diameter side F to the radial airflow E will be assured.

(4) The second clutch plate (driven plate 72) is provided with a vent opening 77 at the spline connection portion with clutch drum 4 for allowing an axial airflow (see FIG. 6).

Therefore, in addition to the effects described in (1) to (3), the airflow resistance the airflow exiting facing groove 76 encounters when flowing along the spline connection portions of clutch drum 6 may be held reduced and an orderly flow of axial external diameter side airflow G may be obtained.

(5) The cover member (housing cover 60) may be provided with the outside air intake hole 66 at the inner diameter side corresponding to the axial direction of the vent hole 74 for taking into the outside air to the vent hole 74 and further provided with an outside air discharge hole 67 for the airflow traveling along the spline portions of second clutch plate (driven plate 72) to expel to the outside while suppressing the airflow toward the outside air intake hole 66 by way of a labyrinth structure (see FIG. 5).

Therefore, in addition to the effects of (1) to (4), the airflow circulating within clutch chamber 64 may be suppressed by a labyrinth structure so that an orderly airflow represented by a streamline of "the outside→axially on inner diameter side→radially→axially on outer diameter side→the outside" may be generated.

(6) The dry clutch is formed in a multiple-plate dray clutch 7 interposed between an engine ENG and motor (motor/generator) of hybrid drive system, and the first clutch plate (drive plate 71) is configured for a plurality of vent holes 74 to be communicative in the axial direction (see FIGS. 1 and 2).

Therefore, in addition to the effects of (1) to (5), by expelling or exhausting the wearer powder or abrasion particles to the outside from a plurality of friction surfaces, an abnormal abrasion due to the intervention of wear powder debris accumulated may be prevented and a deterioration of fuel economy due to the drag between friction surfaces are avoided.

Figure 8:
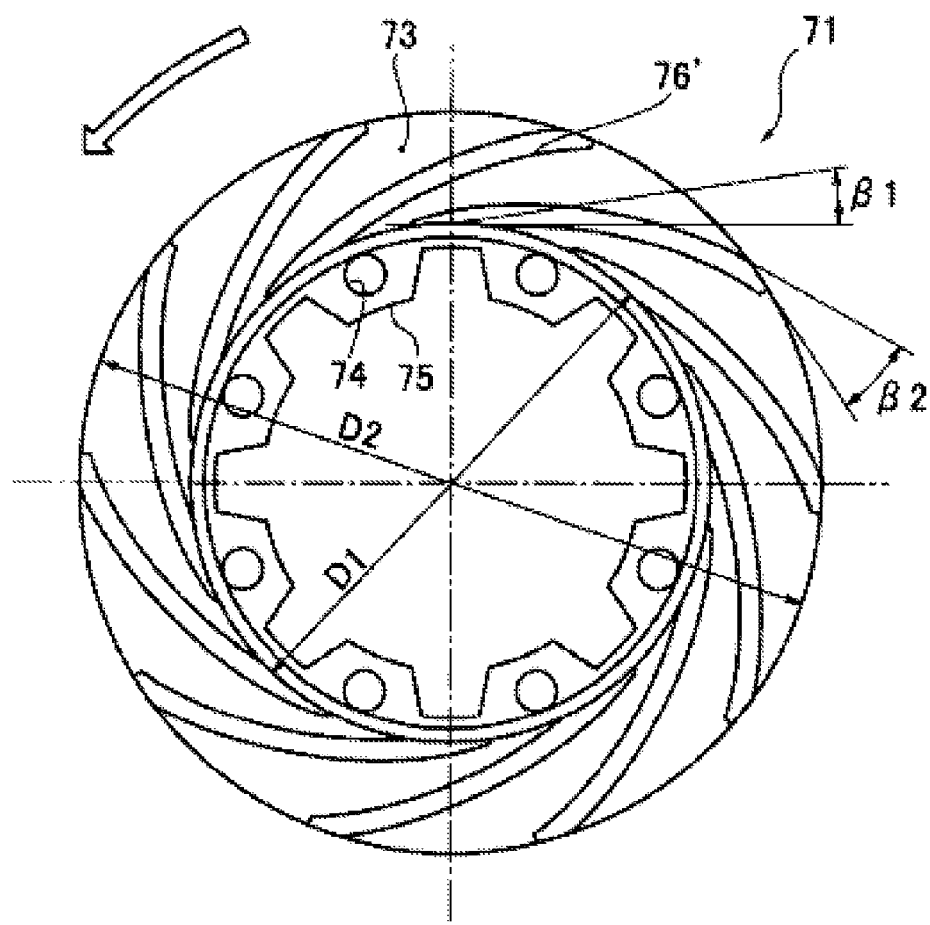
FIG. 8 is a front view showing the other drive plate of multiple-plate dry clutch for the hybrid driving force transmission device in a second embodiment.

The second embodiment is an example in which the shape of the facing groove is different from that formed in the first embodiment. FIG. 8 is a front view showing a multiple-plate dry clutch drive plate in the hybrid driving force transmission device according to the second embodiment.

The friction facing 73 in the second embodiment is provided on both sides of the drive plate 71 and the friction surface is pressed against the plate surface of driven plate 72. This friction facing 73 is an annular plate, and as shown in FIG. 8, and is formed with a facing groove 76' in such a way that, when D1 is defined as an inner diameter and D2 as an outer diameter, the exit angle β2 to the tangential of the outer diameter is larger than the inflow angle β1 with respect to the tangential of inner diameter with the curve angle being varied gradually from the inflow side toward the outflow side (e.g., trochoid curve).

Note that other configurations are the same as in the first embodiment, illustration and description thereof is omitted.

In the second embodiment, the friction facing 73 has a facing groove 76' in which the exit angle β2 to the tangential to the outer diameter is larger than the inflow angle β1 with respect to the tangential of inner diameter with a facing groove 76' which curve angle varies gradually from the inflow side toward the outflow side (see FIG. 8).

Therefore, a radial airflow E may be formed with a dry clutch (multiple-plate dry clutch 7) disposed within a concealed space (clutch chamber 64) flowing through smoothly from the side of clutch hub 3.

In the hybrid driving force transmission device in the second embodiment, the following effects may be achieved in addition to those in the first embodiment.

(7) The friction facing 73 is configured to have facing groove 76' in such way that the exit angle β2 to the tangential of the outer diameter is larger than the inflow angle β1 with respect to the tangential of inner diameter with the curve angle being varied gradually from the inflow side toward the outflow side (FIG. 8).

Therefore, a radial airflow E may be formed with a dry clutch (multiple-plate dry clutch 7) disposed within a concealed space (clutch chamber 64) flowing through smoothly from the side of clutch hub 3 to clutch drum 6. In the first and second embodiments, a multiple-plate dry clutch is shown, a single-plate dry clutch or the like may be employed as well. In the first and second embodiments, a dray clutch of normal opened type is used. However, a dry clutch of normally closed type utilizing a diaphragm spring may be equally used. In the first and second embodiments, such an example is shown in which drive plate 71 is splined to clutch hub 3 and driven plate 72 is splined to clutch drum 6. However, the drive plate may be splined to the clutch drum and the driven plate splined to clutch hub. In the first and second embodiments, friction facing 73 is provided on drive plate 71. However, the friction facing may be provided on the driven plate.

In the first and second embodiments, vent opening 77 is formed by forming a recess 78 at the central position of spline projection portion protruding outwardly, and thus, when engaged with spline teeth of clutch drum 6, by providing an opening area. However, for example, the spline teeth to be splined to the clutch drum may be pulled out or omitted every other tooth. Moreover, by setting the depth of spline groove deep with the height of spline tooth to be engaged low, when both are meshed with each other, both components may form an opening area or space.

In the first and second embodiments, an example of application to a hybrid driving force transmission device is descried equipped with an engine and motor/generator with a dry clutch functioning as driving mode transition clutch. However, application to such an engine driving force transmission device equipped with an engine where the engine is a sole propulsion source and a dry clutch is used for a starting clutch. Moreover, other application to a motor driving force transmission device as in the electric vehicle or fuel cell vehicle and the like where a motor/generator is a sole propulsion source and a dry clutch is used as a starting clutch.

The description has been made with reference to the first and second embodiments. However, the specific configurations are not limited to these embodiments, but design alterations or addition are allowed within the scope of claims without departing from the spirit of the invention as claimed.

The invention claimed is:

1. A driving force transmission device with a dry clutch for selectively connecting and disconnecting a driving force disposed in a sealed space, the dry clutch comprising:
    a first clutch plate splined to a clutch hub at a first spline connection portion having a plurality of spline teeth arranged on an inner periphery of the first clutch plate, the first clutch plate comprising:
        a friction facing having a plurality of grooves each extending radially along the friction facing; and
        a plurality of vent holes, each of the plurality of vent holes substantially within a respective spline tooth in an axial direction, each of the plurality of vent holes aligned with a respective groove in a radial direction and configured to allow air flow in the axial direction;
    a second clutch plate splined to a clutch drum at a second spline connection portion having a plurality of spline teeth arranged on an outer periphery of the second clutch plate, each of the plurality of spline teeth having a recess in an outwardly radial edge configured to form an open space when the second clutch plate is engaged with spline teeth of the clutch drum, wherein the friction facing is configured to press a friction surface against a face of the second clutch plate when connecting the clutch; and
    a cover member including an outside air intake hole to receive outside air into the sealed space and an outside air discharge hole to exhaust airflow from the sealed space to the outside.

2. The driving force transmission device as claimed in claimed in claim 1, wherein the friction facing is an annular plate member and the plurality of grooves are each formed radially outwardly from an inner diameter side to an outer diameter side, and
    each of the plurality of vent holes is positioned radially inwardly of an inner end of the respective groove.

3. The driving force transmission device as claimed in claim 1, wherein the cover member is provided with the outside air intake hole at an inner diameter side corresponding to the axial direction of the vent hole for taking in the outside air through the vent hole, and further provided with the outside air discharge hole to expel the airflow traveling along spline portions of the second clutch plate to the outside while suppressing the airflow toward the outside air intake hole by way of a labyrinth structure, wherein the outside air intake hole and the outside air discharge hole are on a same side of the dry clutch.

4. The driving force transmission device as claimed in claim 1, wherein the plurality of grooves on the friction facing are each configured such that an exit angle to a tangential of an outer diameter of the friction facing is larger than an inflow angle with respect to a tangential of an inner diameter of the friction facing with a curve angle being varied gradually from an inflow side toward an outflow side.

5. The driving force transmission device as claimed in claim 1, wherein the dry clutch is a multiple-plate dry clutch disposed between an engine and a motor of a hybrid driving force transmission system, and
    the first clutch plate is configured such that the vent holes in a plurality of plates are communicative to each other in an axial direction.

* * * * *